United States Patent
Hong et al.

(10) Patent No.: US 8,405,884 B2
(45) Date of Patent: Mar. 26, 2013

(54) SCANNER, IMAGE CORRECTING METHOD, AND IMAGE FORMING APPARATUS FOR CORRECTING AN IMAGE BY DETERMINING A FOREIGN SUBSTANCE POSITION BASED ON A SHADING PROFILE

(75) Inventors: Jin-kyung Hong, Seoul (KR); Jonghyon Yi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 876 days.

(21) Appl. No.: 12/489,810

(22) Filed: Jun. 23, 2009

(65) Prior Publication Data

US 2010/0073734 A1 Mar. 25, 2010

(30) Foreign Application Priority Data

Sep. 25, 2008 (KR) .......................... 10-2008-0094122

(51) Int. Cl.
*H04N 1/40* (2006.01)
*G06K 7/00* (2006.01)
*G03G 15/04* (2006.01)

(52) U.S. Cl. ........ 358/461; 358/448; 358/474; 358/496; 358/1.9; 358/505; 358/509; 358/512; 382/193; 382/275; 382/291; 382/312; 399/32; 399/151; 399/202; 356/3.09; 356/141.4; 356/607

(58) Field of Classification Search .................. None
See application file for complete search history.

(56) References Cited

U.S. PATENT DOCUMENTS

| | | | |
|---|---|---|---|
| 7,619,666 B2 * | 11/2009 | Kotani .................... 348/241 |
| 7,630,102 B2 * | 12/2009 | Kurokawa .................... 358/474 |
| 7,751,095 B2 * | 7/2010 | Suzuki et al. ................. 358/474 |
| 7,961,356 B2 * | 6/2011 | Shin ........................... 358/3.21 |
| 8,169,672 B2 * | 5/2012 | Yamauchi et al. ............ 358/475 |
| 2006/0066916 A1 * | 3/2006 | Ishiguro et al. .............. 358/474 |
| 2006/0285174 A1 * | 12/2006 | Jeon .............................. 358/461 |
| 2008/0024839 A1 * | 1/2008 | Okada et al. .................. 358/497 |
| 2008/0100879 A1 | 5/2008 | Lee |

* cited by examiner

*Primary Examiner* — Steven Kau
(74) *Attorney, Agent, or Firm* — Staas & Halsey LLP

(57) ABSTRACT

A scanner including: a transparent plate; a light emitting unit that emits light to an object on the transparent plate; a sensor to form an image of the object; a focusing lens unit that is arranged on a light path between the transparent plate and the sensor, to focus light from the object onto the sensor; and a controller to determine whether a foreign substance is disposed in the light path, using the image, calculates a position of the foreign substance, and corrects the image on the basis of the calculated position of the foreign substance.

20 Claims, 12 Drawing Sheets

SCANNER, IMAGE CORRECTING METHOD, AND IMAGE FORMING APPARATUS FOR CORRECTING AN IMAGE BY DETERMINING A FOREIGN SUBSTANCE POSITION BASED ON A SHADING PROFILE

CROSS-REFERENCE TO RELATED APPLICATION

This application claims priority from Korean Patent Application No. 10-2008-0094122, filed on Sep. 25, 2008 in the Korean Intellectual Property Office, the disclosure of which is incorporated herein by reference.

BACKGROUND OF THE INVENTION

1. Field of the Invention

Aspects of the present invention relate to a scanner, an image correction method therein and an image forming apparatus having the same.

2. Description of the Related Art

In a typical scanner, light is emitted from a light source to an object, such as a document placed on a transparent plate. The light is reflected from the document by a plurality of mirrors and is then focused on an image sensor by a focusing optical system. If a foreign substance is disposed between the document and the image sensor, it is difficult to acquire a high quality scan, due to noise generated by the foreign substance.

In order to reduce the influence of the foreign substance, a conventional method includes: acquiring a shading profile by scanning in a foreign substance detection mode; determining whether a foreign substance is detected with reference to a threshold value; and correcting noise generated due to the detected foreign substance, using an average filter. However, if the threshold is not appropriately applied, the presence of a foreign substance may be mistakenly detected, thereby causing difficulty in reducing the influence of the foreign substance.

Further, in the case that a foreign substance is disposed on a white testing patch formed on a transparent plate, even though a shading profile is acquired in a shifted acquired point, the influence of the foreign substance cannot be reduced. Furthermore, in the conventional method, it takes a long time to calculate a correction value, for an image region influenced by the foreign substance. In addition, the conventional method can determine only a position of the foreign substance in a sub-scan direction, that is, a direction perpendicular to a scan direction, in which a mirror, a focusing optical system and an image sensor move. The conventional method also cannot determine how far from the image sensor the foreign substance is, that is, the conventional method cannot determine the location of the foreign substance.

SUMMARY OF THE INVENTION

Aspects of the present invention provide a scanner, an image correction method thereof, and an image forming apparatus employing the same, which can determine a position of a foreign substance, based on a width and a depth of a defective portion of a shading profile, to correct an image.

The foregoing and/or other aspects of the present invention can be achieved by providing a scanner including: a transparent plate; a light emitting unit that emits light to an object on the transparent plate; a sensor that acquires information on the object; a focusing lens unit that is arranged between the transparent plate and the sensor, and focuses the light reflected from the object onto the sensor; and a controller that determines whether a foreign substance is disposed in a light path between the object and the sensor, using information acquired from the sensor, calculates the position of the foreign substance, and corrects an image on the basis of the calculated position of the foreign substance.

According to aspects of the present invention, the controller may filter a shading profile acquired from the sensor, to determine whether the foreign substance is disposed in the light path. The controller may calculate, a distance M(i) between the focusing lens unit and the foreign substance, according to the following equation:

$$M(i) = \frac{(v+1) \cdot L \cdot F \cdot Z}{W \cdot y + (v+1) \cdot Z \cdot L},$$

where v is a depth of a defective portion of the shading profile; L is a width of the focusing lens unit in a sub-scan direction; F is a distance between the focusing lens unit and the transparent plate; Z is a width of the sensor in the sub-scan direction; W is a width of an image projected in the sub-scan direction; and y is a width of the defective portion of the shading profile.

According to aspects of the present invention, a test patch may be formed on the transparent plate, which used to apply to at least one of a shading correction, a gamma correction, and a color correction operation to the image.

According to aspects of the present invention, the scanner may further include a plurality of mirrors that are arranged in the light path between the transparent plate and the focusing lens unit. The mirrors reflect the light reflected from the object, to confine the light path to a predetermined space.

According to aspects of the present invention, the controller may convert a value of the defective portion of the filtered shading profile, to a value of an adjacent non-defective portion of the filtered shading profile. The controller may maintain the value of the defective portion as is, so that a value of the image detected from the sensor coincides with the shading profile, during the shading correction.

According to aspects of the present invention, the plurality of mirrors may include a first mirror and a second mirror, which are adjacent to each other and arranged on the light path between the focusing lens unit and the transparent plate.

According to aspects of the present invention, the controller may maintain the value of the defective portion of the filtered shading profile as is; and if it is determined that the foreign substance is disposed on at least one of the plurality of mirrors, other than the first and second mirrors, may convert the value of the defective portion of the filtered shading profile into a filtered average value.

The foregoing and/or other aspects of the present invention can be also achieved by using the scanner, according to an image correction method comprising: using the sensor to determine whether a foreign substance is disposed in the light path between the object and the sensor; calculating a position of the foreign substance; and correcting an image based on the calculated position of the foreign substance.

According to aspects of the present invention, the determining of the existence of the foreign substance may include: calculating a filtered average profile by performing a Windows-based average filtering for a shading profile acquired from the sensor; comparing the acquired shading profile with the filtered average profile; selecting an output value that is smaller than the filtered average profile, from among output values of the acquired shading profile; and removing the remaining output values.

According to aspects of the present invention, the calculating of the position of the foreign substance may include calculating a distance M(i) between the focusing lens unit and the foreign substance, according to the following equation:

$$M(i) = \frac{(v+1) \cdot L \cdot F \cdot Z}{W \cdot y + (v+1) \cdot Z \cdot L},$$

where v is a depth of a defective portion of the shading profile; L is a width of the focusing lens unit in a sub-scan direction; F is a distance between the focusing lens unit and the transparent plate; Z is a width of the sensor in the sub-scan direction; W is a width of an image projected in the sub-scan direction; and y is a width of the defective portion of the shading profile.

According to aspects of the present invention, a test patch, which is applied to at least one of a shading correction, a gamma correction, and a color correction operation for the image, may be formed on the transparent plate. The correcting the image may include converting a value of the defective portion of the filtered shading profile into a value of an adjacent non-defective portion of the filtered shading profile.

According to aspects of the present invention, the scanner may further include a plurality of mirrors arranged in the light path between the transparent plate and the focusing lens unit. The mirrors reflect the light reflected from the object, to confine the light path in a predetermined space.

According to aspects of the present invention, the correcting the of image may include maintaining the value of the defective portion of the filtered shading profile as is, so that a value of the image detected from the sensor coincides with the shading profile, during the shading correction.

According to aspects of the present invention, the plurality of mirrors may include a first mirror and a second mirror, which are adjacent to each other and sequentially arranged on the light path, between the focusing lens unit and the transparent plate.

According to aspects of the present invention, the correcting of the image may include, maintaining the value of the defective portion of the filtered shading profile as is, and, if it is determined that the foreign substance is disposed on one of the plurality of mirrors other than the first and second mirrors, converting the value of the defective portion of the filtered shading profile into a filtered average value.

The foregoing and/or other aspects of the present invention can be also achieved by providing an image forming apparatus, including: the scanner as described above; and an image processing part that processes an image acquired from the scanner.

According to aspects of the present invention, the image processing part may include: at least one of a file forming part that forms an image file from the acquired image; and an image forming part that forms an image on a printing medium, corresponding to the acquired image.

According to aspects of the present invention, the controller may filter a shading profile acquired from the sensor, to determine whether the foreign substance is disposed in the light path. The controller may calculate a distance M(i) between the focusing lens unit and the foreign substance, according to the following equation, $$M(i) = \frac{(v+1) \cdot L \cdot F \cdot Z}{W \cdot y + (v+1) \cdot Z \cdot L},$$

where v is a depth of a defective portion of the shading profile; L is a width of the focusing lens unit in a sub-scan direction; F is a distance between the focusing lens unit and the transparent plate; Z is a width of the sensor in the sub-scan direction; W is a width of the image projected in the sub-scan direction; and y is a width of the defective portion of the shading profile.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Figure 1:
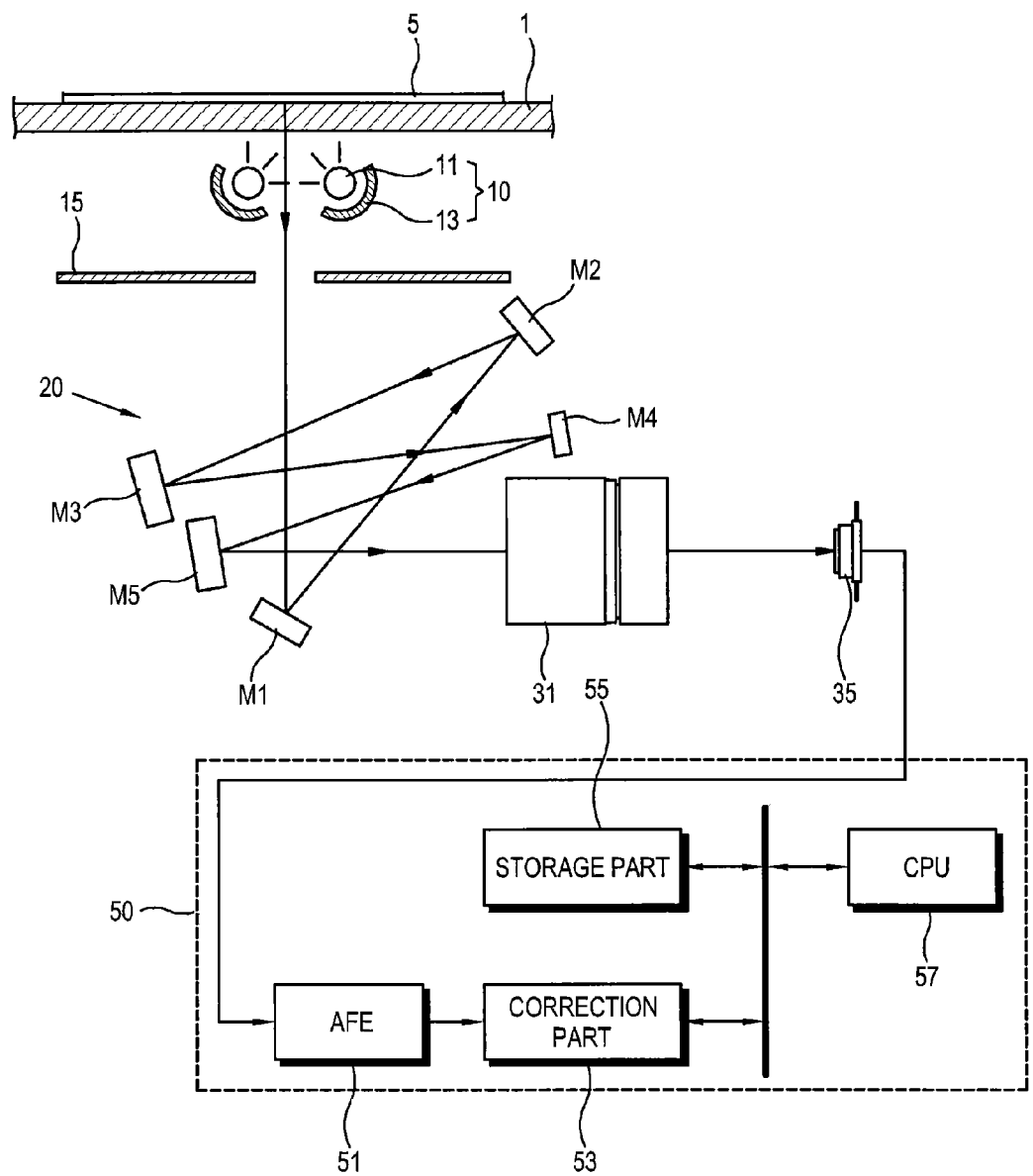
FIG. 1 schematically illustrates a scanner, according to an exemplary embodiment of the present invention.

Reference will now be made in detail to the exemplary embodiments of the present invention, examples of which are illustrated in the accompanying drawings, wherein like reference numerals refer to like elements throughout. The exemplary embodiments are described below, so as to explain the aspects of the present invention, by referring to the figures. Repetitive description with respect to like elements of different embodiments may be omitted.

Figure 2:
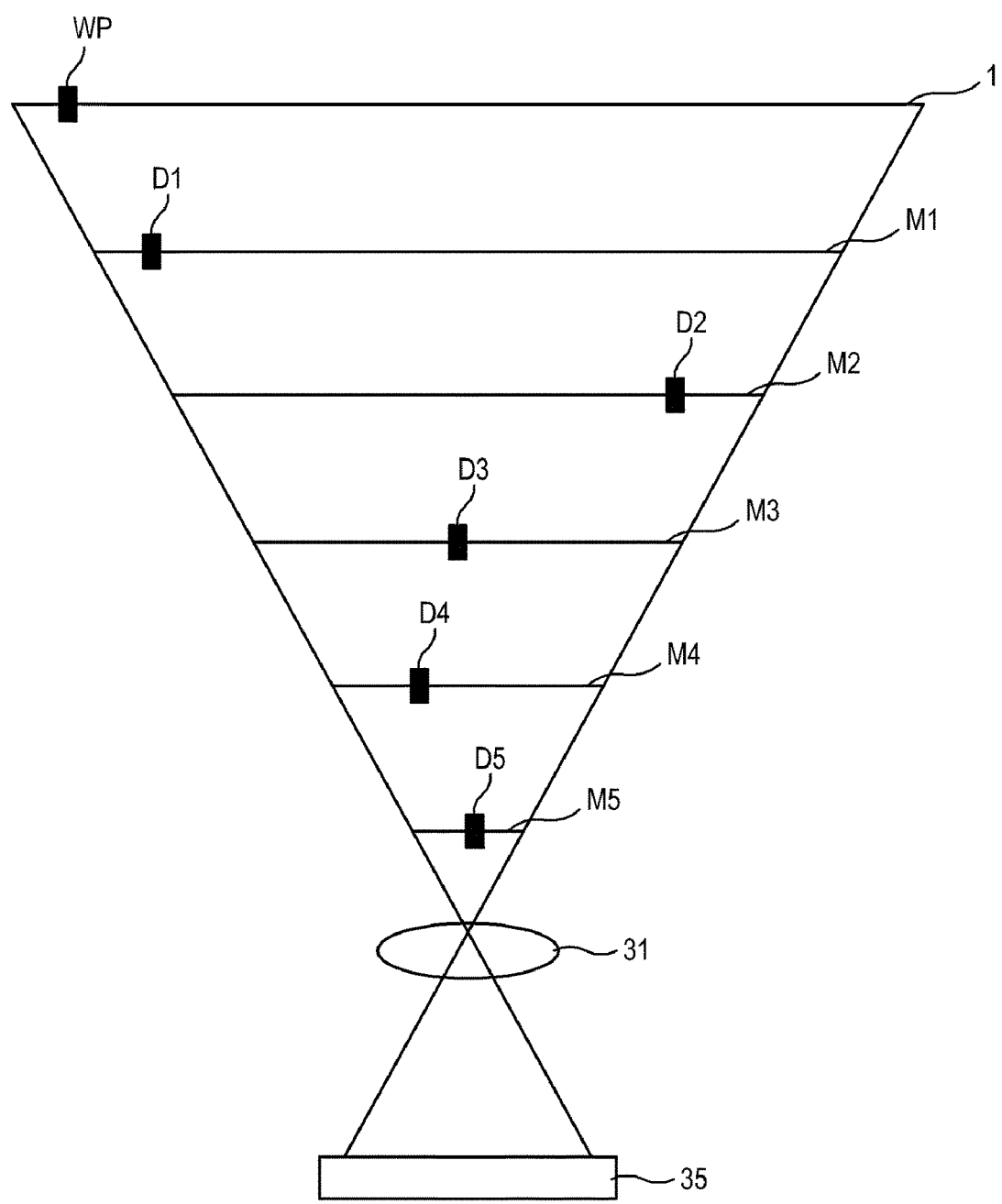
FIG. 2 schematically illustrates optical elements in FIG. 1.

FIG. 1 schematically illustrates a scanner according to an exemplary embodiment of the present invention, and FIG. 2 schematically illustrates optical elements in FIG. 1. Referring to FIGS. 1 and 2, the scanner includes: a transparent plate 1;

a light emitting unit 10; a sensor 35; a focusing lens unit 31; and a controller 50. The scanner includes a plurality of mirrors 20 arranged to reflect light along a light path between the transparent plate 1 and the focusing lens unit 31.

In an image correction mode, a test patch, such as a white patch (WP), is formed on the transparent plate 1. The test patch can be used to apply a shading correction, a gamma correction, a color correction, or a combination thereof, to an acquired image. The light emitting unit 10 emits light to an object, such as a document placed on the transparent plate 1. The light emitting unit 10 may include a light source 11 and a mirror 13 provided near the light source 11. The mirror 13 reflects the light emitted from the light source 11, towards the object 5.

The mirrors 20 reflect the light reflected from the object 5, so as to confine the light path in a specific space. With the mirrors 20, it is possible to secure an optical focusing distance between the object 5 and the sensor 35, which is disposed in a compact space.

Referring to FIG. 1, the mirrors 20 include first to fifth mirrors M1, M2, M3, M4, and M5. Accordingly, the light reflected from the object 5 is sequentially reflected by the first mirror M1, the second mirror M2, the third mirror M3, the fourth mirror M4, and the fifth mirror M5, and then toward the focusing lens unit 31. In FIG. 1, five mirrors are exemplified, but the present invention is not limited to any particular number of the mirrors 20.

As shown in FIG. 2, foreign substances D1 to D5 may be formed on the first to fifth mirrors M1 to M5, respectively. The sensor 35 may be, for example, a charge coupled device (CCD). The sensor 35 acquires information about the object 5, such as an image including a shading profile, from the light reflected via the mirrors 20. The focusing lens unit 31 is arranged on the light path, between the mirrors 20 and the sensor 35, to focus the light on the sensor 35.

The controller 50 determines whether the foreign substance is disposed on the light path, using the information acquired by the sensor 35. The controller 50 calculates the position of a detected foreign substance and corrects the image, based on the calculated position of the foreign substance. The controller 50 may include an Analog Front-End (AFE) 51 to convert an analog signal output from the sensor 35 into a digital signal for signal processing; a correction part 53 to correct an image; a storage part 55 to store information about optical elements of the scanner; and a CPU 57 to control scanning.

To detect whether a foreign substance is disposed in the light path, the controller 50 filters the shading profile acquired from the sensor 35. The controller 50 calculates a distance M(i) between the focusing lens unit 31 and any detected foreign substance, according to the following Equation 3, which will be described later.

If a foreign substance is disposed on the test patch WP, the controller 50 converts a value of a corresponding defective portion of the filtered shading profile, into a value of adjacent non-defective region(s) of the filtered shading profile. For example, portions of the filtered shading profile, to the right and left of the defective portion, may be used to calculate an average value. The defective portion may then be uniformly converted to the average value. In this case, the foreign substance on the test patch WP does not block the light path, which is different from the case when the foreign substance is disposed on one of the mirrors 20, and thus, a white line appears in an image. The white line can be corrected using the average value.

If a foreign substance is disposed on the first mirror M1 and/or the second mirror M2, the controller 50 does not change the value of the corresponding defective portion(s) of the filtered shading profile. Thus, during the shading correction, an image output from the sensor 35 coincides with the filtered shading profile.

If a foreign substance is disposed on one of the third through fifth mirrors M3-M5, the controller 50 converts the value of a corresponding defective portion of the shading profile into a filtered average value. This is because, even if foreign substances having the same size are disposed on the first and fifth mirrors M1 and M5, the sizes sensed by the sensor 35 are different. Further, in the case of a severe contamination of foreign substances, the scanner may include a display (not shown) to inform a user that it is difficult to reproduce a scanned image in a sub-scan direction, due to the severe contamination.

Figure 3:
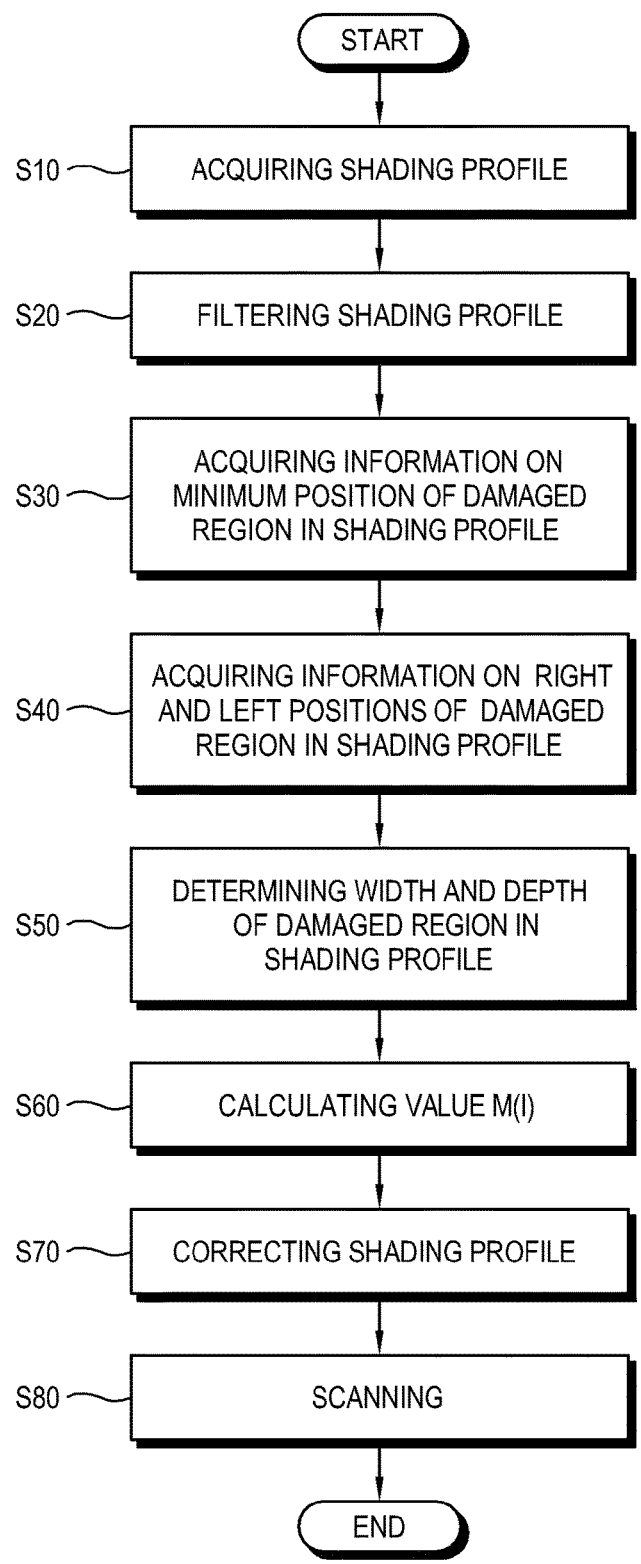
FIG. 3 is a flowchart illustrating an image correction method in a scanner, according to an exemplary embodiment of the present invention.

Hereinafter, an image correction method using the scanner, according to an exemplary embodiment of the present invention, will be described with reference to FIGS. 1 and 3. Referring to FIGS. 1 and 3, the image correcting method includes: determining whether a foreign substance is disposed in the light path between the object 5 and the sensor 35, by using information (an image including a shading profile) acquired by the sensor 35 (S10 to S30); calculating the position of the detected foreign substance (S40 to S60); and correcting the image based on the calculated position of the foreign substance (S70). More specifically, to detect the foreign substance, the shading profile is acquired by the sensor 35 (S10); the acquired shading profile is filtered (S20); and then information on the position of a defective portion of the shading profile (corresponding to the foreign substance) is acquired (S30).

Figure 4:
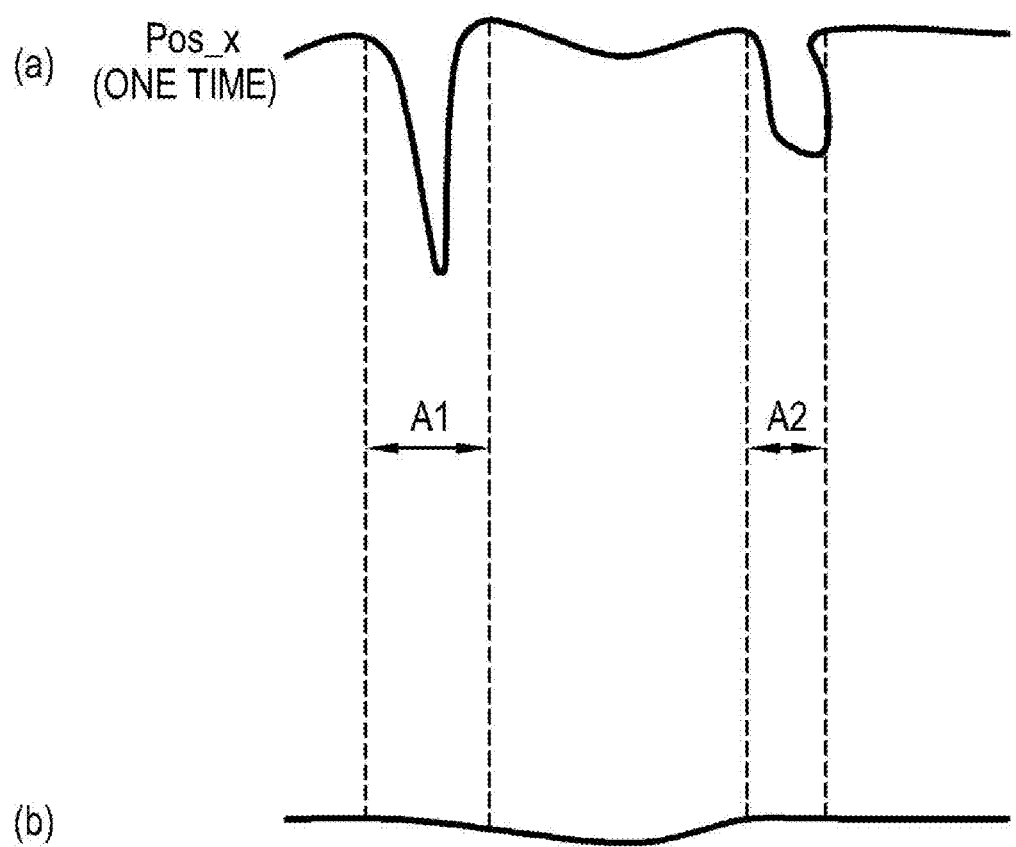
FIGS. 4(a) and 4(b) respectively illustrate a shading profile detected from a sensor and a corrected profile.

As shown in FIG. 4, operation S10 is performed (one time) for a position Pos_x, to acquire a shading profile (a). The shading profile (a) is stored in the storage part 55. In the shading profile (a), A1 and A2 represent defective portions corresponding to foreign substances. The shading profile (a) may be corrected, through operations S40 to S70, as shown in shading profile (b) of FIG. 4. Here, a scanner head does not need to move to compensate for the defective portions.

Figure 5:
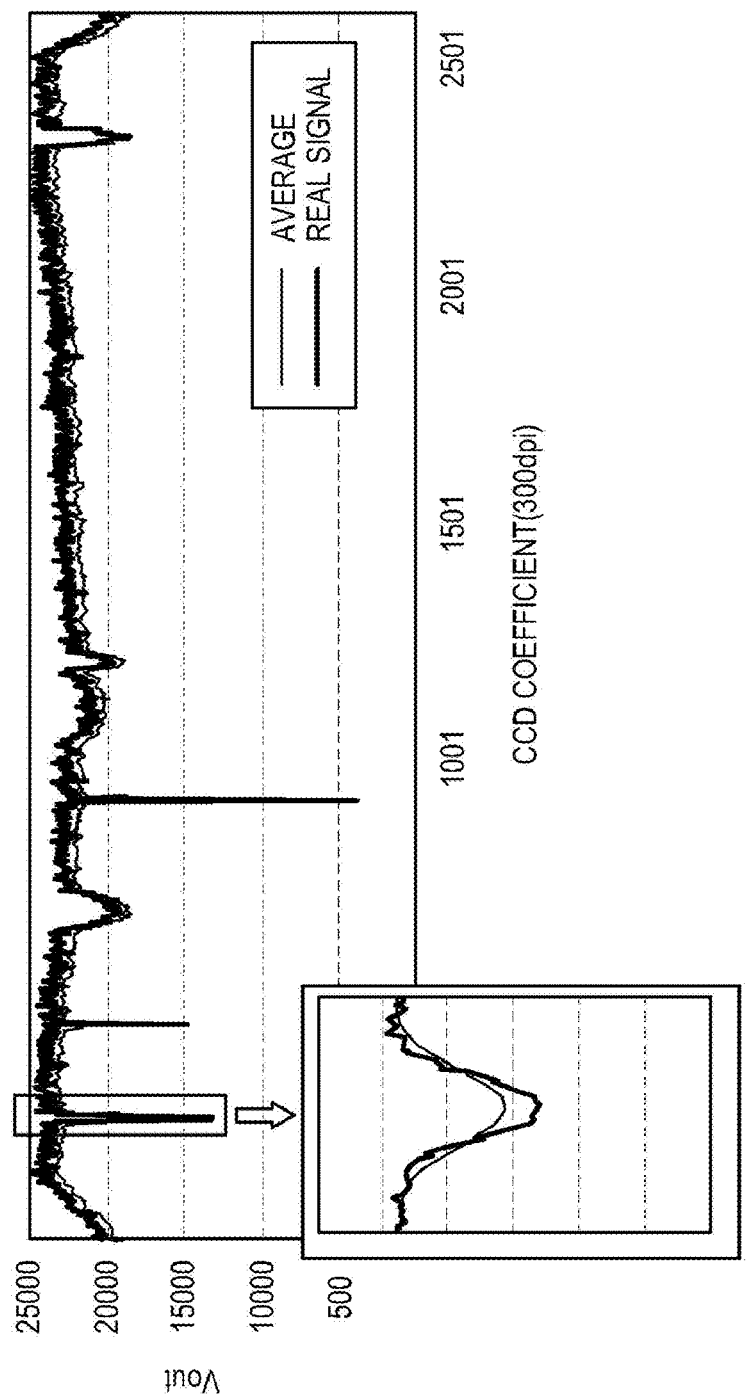
FIG. 5 is a graph illustrating an acquired shading profile and a filtered profile.

Referring to FIG. 5, in operation S20, the acquired shading profile is filtered through a Windows-based average filtering, using an offset, to thereby obtain a filtered average shading profile. In this respect, the offset is used to compensate for noise of the scanner. In FIG. 5, the horizontal axis represents the CCD coefficient (300 dpi) in a sub-scan direction; and the vertical axis represents the voltage of an output signal (Vout).

Figure 6:
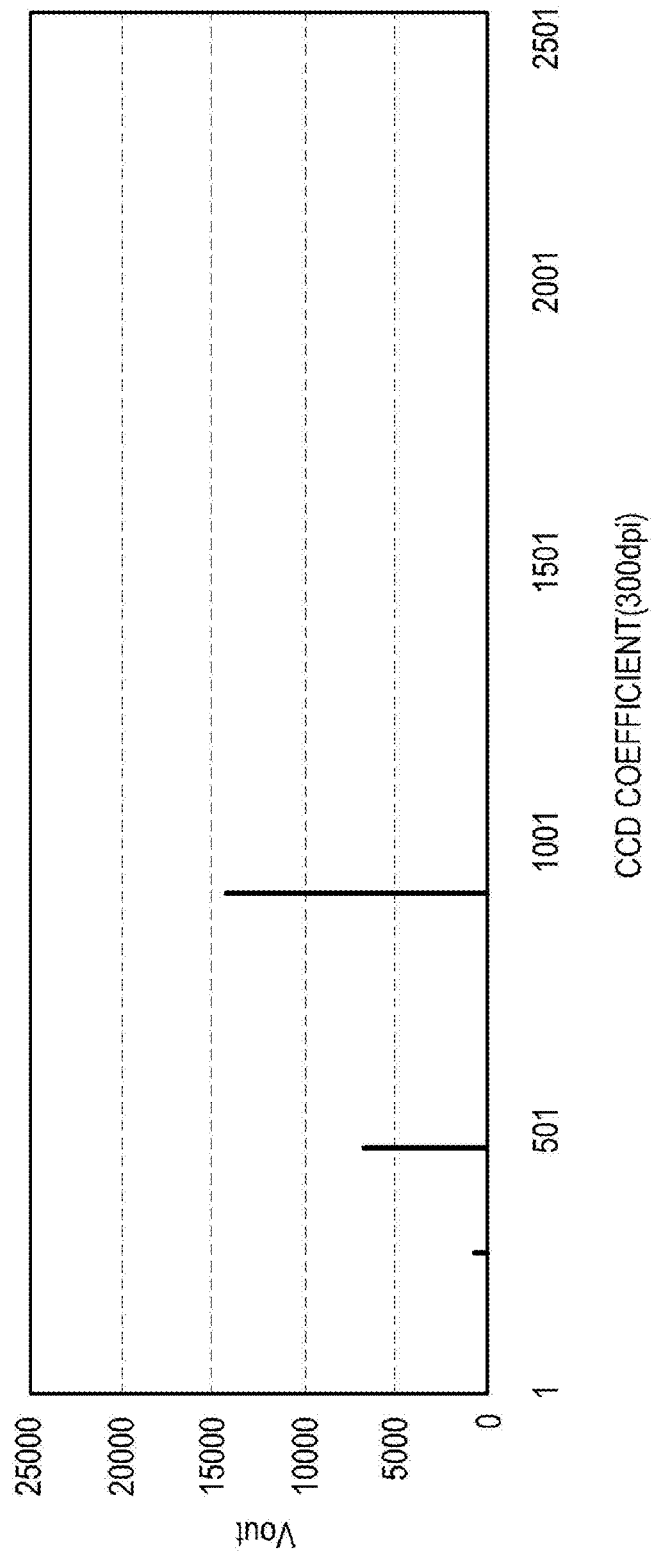
FIG. 6 is a graph illustrating a value Q for a characteristic part of the shading profile detected from the filtered profile in FIG. 5.

Referring to FIG. 6, in operation S30, the acquired shading profile is compared with the filtered average shading profile. Then an output value that is smaller than the filtered average profile is selected from among output values of the acquired shading profile. The remaining output values are removed, with reference to a threshold value. The result is shown FIG. 6.

Then, random noise is removed, and a value Q for a characteristic part of the shading profile is detected in the filtered average profile. Whether the foreign substance is present can be determined, according to the value Q. The value Q satisfies the following Equation 1:

$$Q = w(i) \times |Fv(i) - Fa(i)|, \qquad \text{[Equation 1]}$$

wherein $w(i)=p$; $Fv(i) > Fa(i)$, when $w(i)=1-p$; and $Fv(i) \leqq Fa(i)$, $0 < p < 1$.

In Equation 1: Q refers to a threshold curve shown in FIG. 6; Fv(i) refers to a real signal curve; Fa(i) refers to an average signal curve; i refers to an index; and w refers to a weight. In FIG. 6, p is 0.999.

To calculate the position of the foreign substance, information on portions of the shading profile to the right and left of the defective portion is acquired (S40). The width and the depth of the defective portion of the shading profile are determined (S50). Then the distance M(i) between the focusing lens unit 31 and the foreign substance is calculated, according to the following Equations 2 and 3 (S60). More specifically, when the light traveling in the light path is blocked by the foreign substance, the a value of a corresponding portion (defective portion) of the shading profile is reduced. The width and depth of the defective portion is calculated, and then, information about the position of the foreign substance can be estimated, based thereon.

Figure 7:
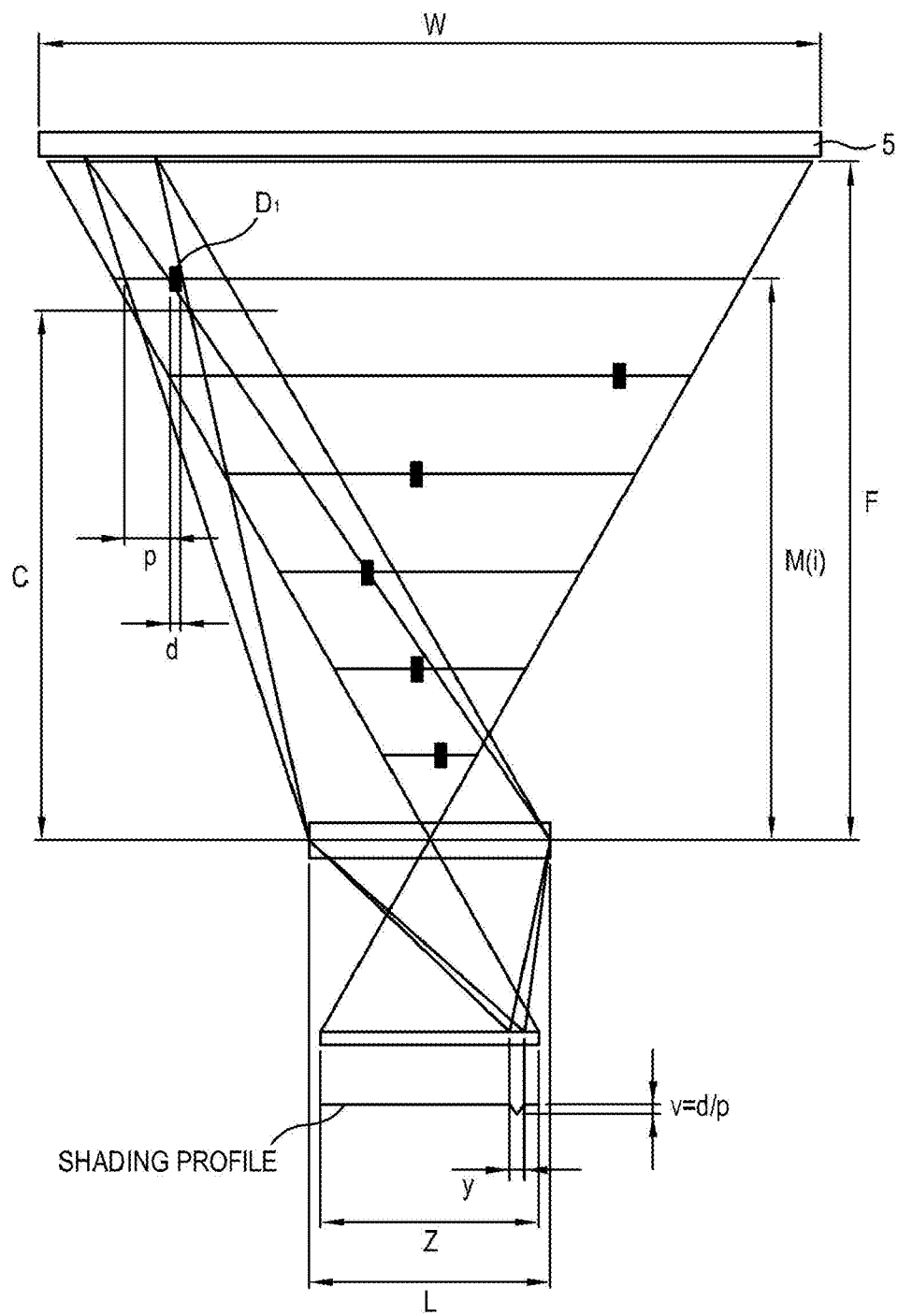
FIG. 7 illustrates a process for calculating a distance M(i), in the case that foreign substances exist on first to fifth mirrors.

FIG. 7 illustrates a process for calculating the distance M(i) between the foreign substance D1 disposed on the first mirror M1, and the focusing lens unit 31, in the case that the foreign substances D1 to D5 are disposed on the first to fifth mirrors M1 to M5, as shown in FIG. 2. Referring to FIG. 7, W, L, Z, M(i), F, c, p, d, y and v satisfy the following Equations 2 and 3:

$$x:y=W:Z,$$ [Equation 2]

wherein $p:L=F-M(i):F$; $c:F-c=L:x$; $d:x=M(i)-c:F-c$; and $d=v*p$.

In Equation 2, x is a width of a lighted region; y is a width of a defective portion of the shading profile; W is a width of an image projected in a sub-scan direction; Z is a width of the sensor in the sub-scan direction; p is a gap between an end of the lighted region and the foreign substance; L is a width of the focusing lens unit in the sub-scan direction; F is a distance between the focusing lens unit and the transparent plate; and v is a depth of the defective portion of the shading profile.

Considering L, F, Z and W as constants, and v and y as variants, in the Equation 2, M(i) can be obtained using Equation 3:

$$M(i) = \frac{(v+1) \cdot L \cdot F \cdot Z}{W \cdot y + (v+1) \cdot Z \cdot L}$$ [Equation 3]

As described before, the physical distance M(i) between the focusing lens unit 31 and the foreign substance may be calculated using information from the scanner, and the width and depth of the defective portion of the shading profile can be calculated, to thereby calculate the position of the foreign substance.

Figure 8:
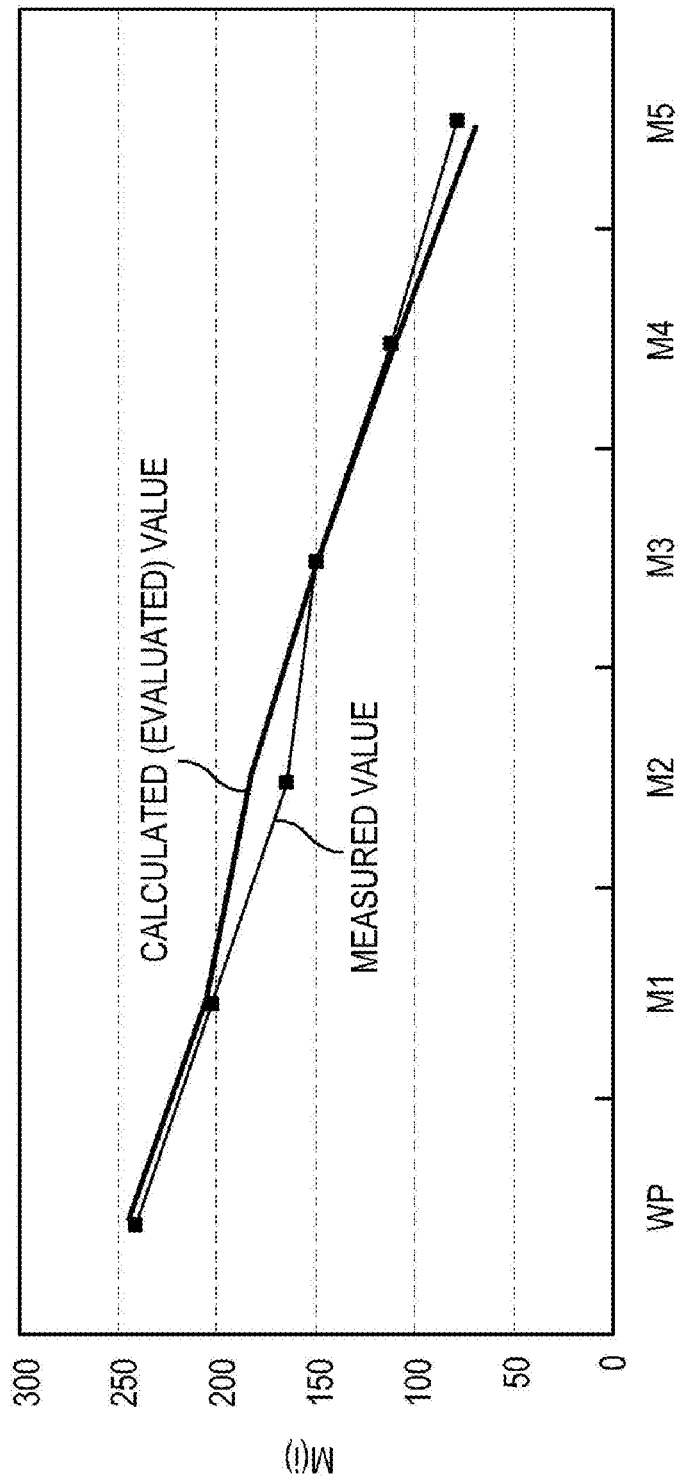
FIG. 8 is a graph illustrating a real measured value and a calculated value, in the case that foreign substances exist on a test patch and first to fifth mirrors.

FIG. 8 is a graph illustrating a measured value and a calculated (estimated) value, using Equation 3, in the case that the foreign substances respectively exist on the test patch WP and the first to fifth mirrors M1 to M5. As shown in FIG. 8, the estimated value nearly coincides with the measured value.

Figure 9:
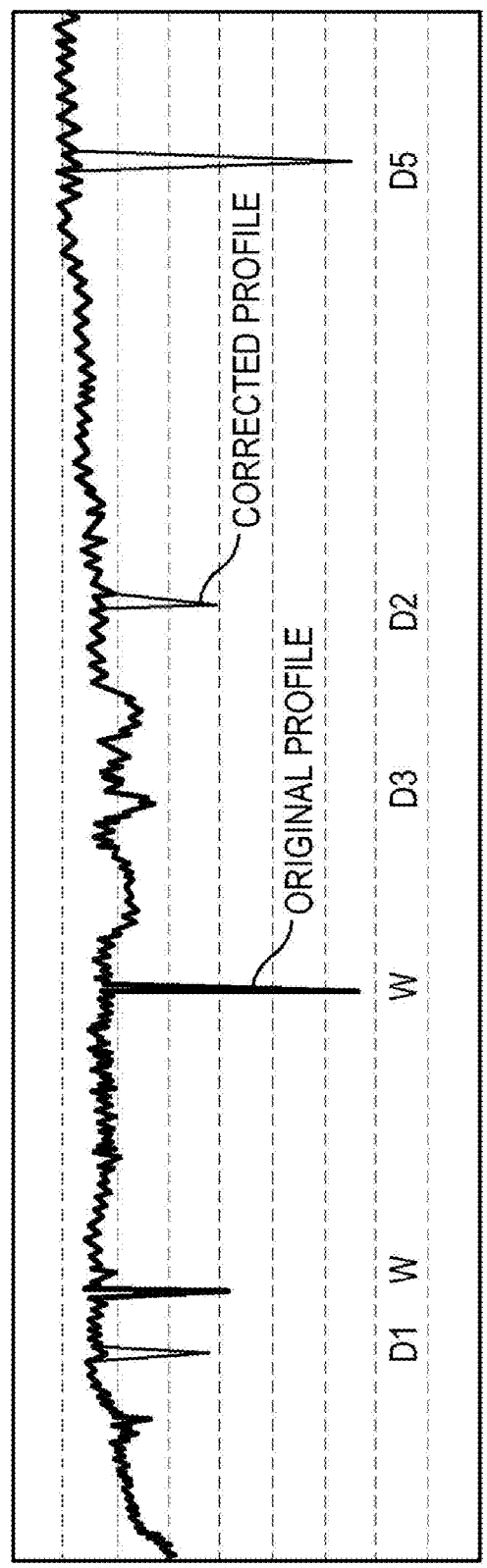
FIG. 9 is a graph illustrating a corrected shading profile in the case that a foreign substance is disposed on a test patch, and in the case that foreign substances exist on mirrors.

Referring to FIG. 9, in operation S70 the case (W) that the foreign substance is disposed on the test patch WP is distinguished from the cases (D1, D2, D3, and D5) where the foreign substances exist on the mirrors M1-M5. If the foreign substance is disposed on the test patch WP, the value of the corresponding defective region of the filtered shading profile is converted into the value of an adjacent valid portion. That is, offset end points disposed on the right and left sides of the defective portion are used to calculate an average value, and the average value is substituted for the value of the defective portion.

If the foreign substance is disposed on at least one of the mirrors M1-M2, the value of the defective portion of the filtered shading profile is maintained. Accordingly, during the shading correction, the value of the image detected from the sensor may correspond to the shading profile. Further, since an offset applied to a black region and a white region is the same, the image can be effectively corrected during gamma correction and color correction. If the foreign substance is disposed on at least one of the mirrors M3-M5, the value of the defective portion of the filtered shading profile may be converted to a filtered average value.

Figure 10A:
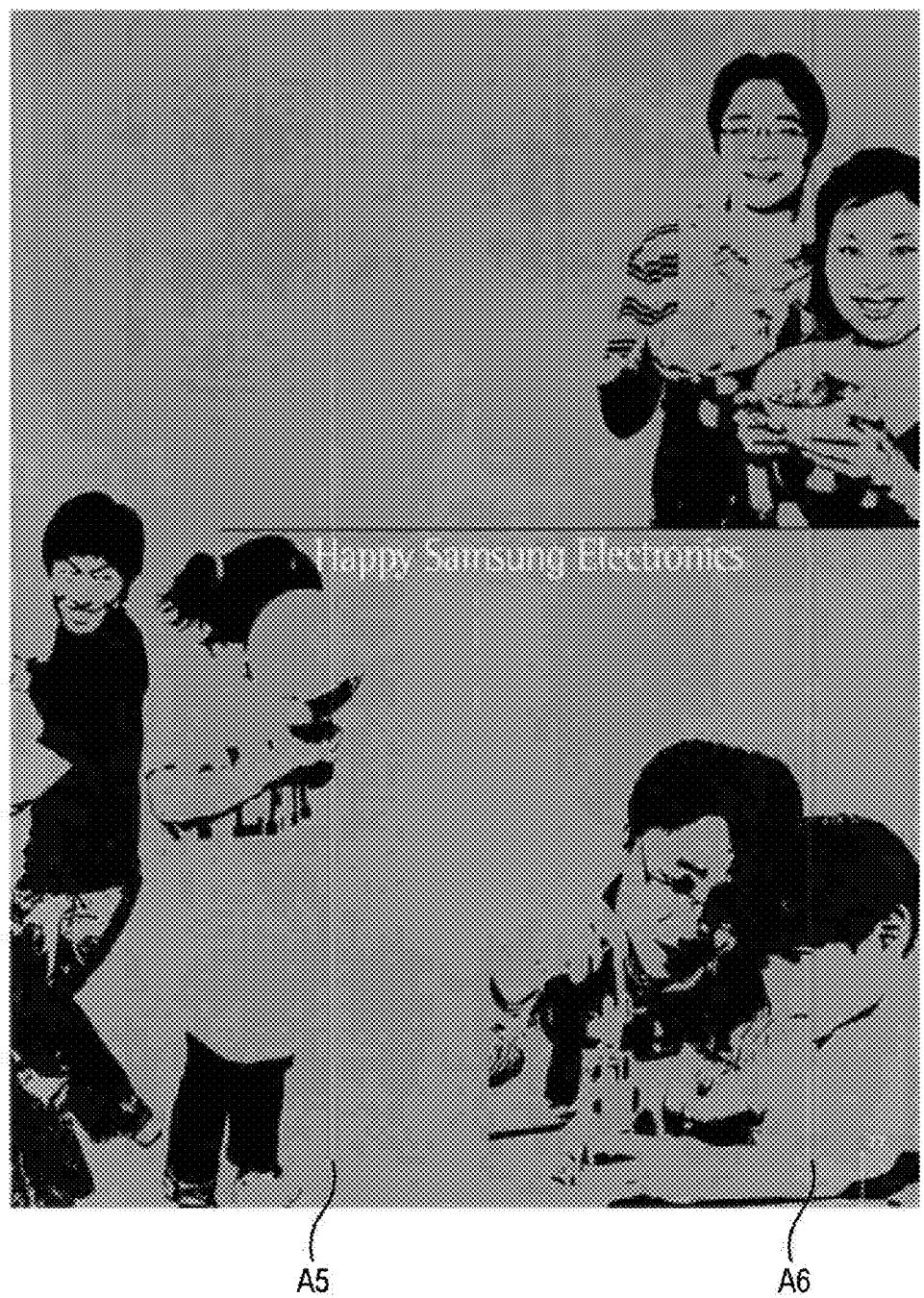
FIGS. 10A and 10B respectively illustrate images, according to a comparative example and an exemplary embodiment of the present invention.
Figure 10B:
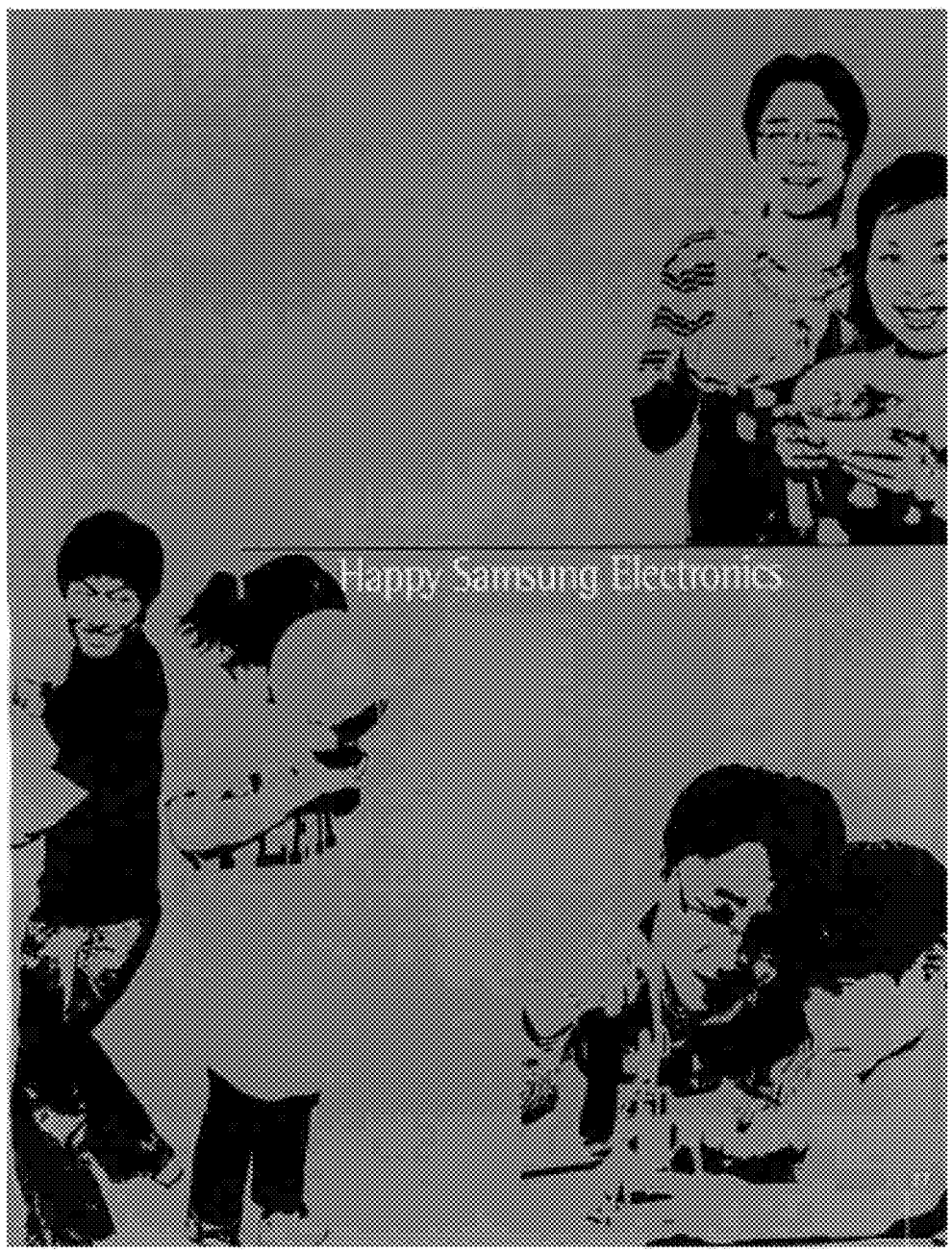

FIGS. 10A and 10B respectively illustrate images according to a comparative example and an exemplary embodiment of the present invention. Referring to FIG. 10A, a white line appears in a region A5, due to a foreign substance being disposed on the test pattern WP, and a black line appears in a region A6, due to a foreign substance being disposed on a mirror 20, according to the comparative example. However, referring to FIG. 10B, corresponding portions become clear, after a correction is made, according to aspects of the present invention.

Figure 11:
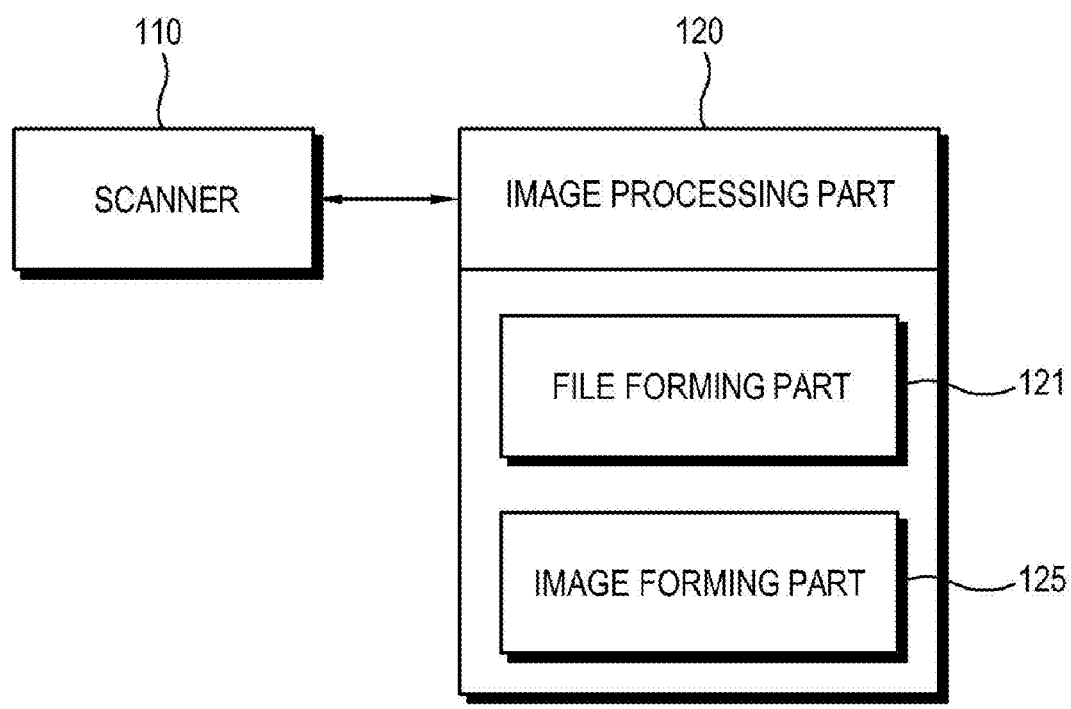
FIG. 11 is a block diagram illustrating an image forming apparatus, according to an exemplary embodiment of the present invention.

FIG. 11 is a block diagram illustrating an image forming apparatus, according to an exemplary embodiment of the present invention. The image forming apparatus includes a scanner 110 and an image processing part 120 to process an image acquired from the scanner 110. The image forming apparatus may include a multi-function printer (MFP), a digital copier, or a scanner apparatus.

The scanner 110 is substantially the same as the scanner described in FIG. 1. The image processing part 120 includes at least one of a file forming part 121 to form an image file from the image acquired from the sensor 35 (FIG. 1) of the scanner 110, and an image forming part 125 to form an image on a printing medium, according to the acquired image.

As described above, according to aspects of the present invention, the width and depth of a foreign substance can be calculated, thereby precisely determining the position of the foreign substance on a test patch or a mirror. Accordingly, an image can be processed to accurately compensate for the position of the foreign substance.

Although a few exemplary embodiments of the present invention have been shown and described, it will be appreciated by those skilled in the art that changes may be made in these exemplary embodiments, without departing from the principles and spirit of the invention, the scope of which is defined in the appended claims and their equivalents.

What is claimed is:

1. A scanner comprising:
    a transparent plate;
    a light emitting unit that emits light to an object disposed on the transparent plate;
    a sensor that detects light from the object, to acquire an image of the object;
    a focusing lens unit disposed on a light path between the transparent plate and the sensor, to focus light from the object onto the sensor; and
    a controller that determines whether a foreign substance is disposed on the light path, by analyzing the image acquired by the sensor, calculates the position of the foreign substance, and corrects the image on the basis of the calculated position of the foreign substance;
    wherein the controller filters a shading profile of the image, to determine whether the foreign substance is disposed in the light path, and calculates a distance between the focusing lens unit and the foreign substance based on both of a depth of a defective portion of the shading profile corresponding to the foreign substance and a width of the defective portion.

2. The scanner as claimed in claim 1, wherein the controller calculates a distance M(i) between the focusing lens unit and the foreign substance, according to the following equation:

$$M(i) = \frac{(v+1) \cdot L \cdot F \cdot Z}{W \cdot y + (v+1) \cdot Z \cdot L},$$

wherein: v is a depth of a defective portion of the shading profile corresponding to the foreign substance; L is a width of the focusing lens unit in a sub-scan direction; F is a distance between the focusing lens unit and the transparent plate; Z is a width of the sensor in the sub-scan direction; W is a width of an image projected in the sub-scan direction; and y is a width of the defective portion of the shading profile.

3. The scanner as claimed in claim 2, further comprising a test patch disposed on the transparent plate,
    wherein the test patch is used to apply a shading correction, a gamma correction, a color correction, or a combination thereof, to the image.

4. The scanner as claimed in claim 3, further comprising mirrors to reflect the light from the object, along the light path.

5. The scanner as claimed in claim 4, wherein the controller converts the value of a defective portion of the filtered shading profile, into a value of an adjacent non-defective portion of the filtered shading profile.

6. The scanner as claimed in claim 4, wherein the controller maintains the value of the defective portion as is, so that a value of the image detected from the sensor coincides with the shading profile, during the shading correction.

7. The scanner as claimed in claim 4, wherein the mirrors comprise a first mirror and a second mirror, which are adjacent to each other and disposed on a portion of the light path closest to the transparent plate.

8. The scanner as claimed in claim 7, wherein the controller:
    maintains the value of the defective portion of the filtered shading profile as is, if determined that the foreign substance is disposed on at least one of the first mirror and the second mirror; and
    converts the value of the defective portion of the filtered shading profile into a filtered average value, if determined that the foreign substance is disposed on any of the mirrors other than the first and second mirrors.

9. An image forming apparatus, comprising:
    the scanner as claimed in claim 1; and
    an image processing part that processes the image.

10. The apparatus as claimed in claim 9, wherein the image processing part comprises:
    a file forming part that forms an image file corresponding to the image; and
    an image forming part that forms a copy of the image on a printing medium.

11. The apparatus as claimed in claim 9, wherein the controller filters a shading profile of the image, to determine whether the foreign substance is disposed on the light path.

12. The apparatus as claimed in claim 9, wherein the controller calculates a distance M(i) between the focusing lens unit and the foreign substance, according to the following equation, $$M(i) = \frac{(v+1) \cdot L \cdot F \cdot Z}{W \cdot y + (v+1) \cdot Z \cdot L},$$

where v is a depth of a defective portion of the shading profile; L is a width of the focusing lens unit in a sub-scan direction; F is a distance between the focusing lens unit and the transparent plate; Z is a width of the sensor in the sub-scan direction; W is a width of the image projected in the sub-scan direction; and y is a width of the defective portion of the shading profile.

13. An image correction method for a scanner that comprises:
    a transparent plate; a light emitting unit that emits light to an object on the transparent plate; a sensor that detects light from the object, to form an image of the object; and a focusing lens unit focuses the light from the object on the sensor, the method comprising:
    determining whether a foreign substance is disposed in a light path between the object and the sensor, using the image formed by the sensor;
    calculating a position of the foreign substance; and
    correcting the image, based on the calculated position of the foreign substance,
    wherein the determining whether the foreign substance is disposed in the light path comprises filtering a shading profile of the image, and
    wherein the calculating a position of the foreign substance comprises calculating a distance between the focusing lens unit and the foreign substance based on both of a depth of a defective portion of the shading profile corresponding to the foreign substance and a width of the defective portion.

14. The method as claimed in claim 13, wherein the determining whether the foreign substance is disposed in the light path further comprises:
    calculating a filtered average profile by performing a Windows-based average filtering on a shading profile of the image;
    comparing the shading profile with the filtered average profile; and
    taking an output value that is smaller than a corresponding value of the filtered average profile, from among output values of the acquired shading profile, and removing the remaining output values thereof.

15. The method as claimed in claim 14, wherein the calculating the position of the foreign substance comprises calculating a distance M(i) between the focusing lens unit and the foreign substance, according to the following equation, $$M(i) = \frac{(v+1) \cdot L \cdot F \cdot Z}{W \cdot y + (v+1) \cdot Z \cdot L}$$

where v is a depth of a defective portion of the shading profile; L is a width of the focusing lens unit in a sub-scan direction; F is a distance between the focusing lens unit and the transparent plate; Z is a width of the sensor in the sub-scan direction; W is a width of an image projected in the sub-scan direction; and y is a width of the defective portion of the shading profile.

16. The method as claimed in claim 13, wherein: a test patch is formed on the transparent plate, which is used for at least one of a shading correction, a gamma correction, and a color correction of the image; and
    the correcting the image comprises converting a value of the defective portion of the filtered shading profile, into a value of an adjacent non-defective portion of the shading profile.

17. The method as claimed in claim 13, wherein the scanner further comprises mirrors arranged along the light path, to secure the light path in a predetermined space.

18. The method as claimed in claim 17, wherein the correcting the image comprises, maintaining the value of the defective portion of the filtered shading profile as is, so that a value of the image detected from the sensor coincides with the shading profile, during the shading correction.

19. The method as claimed in claim 17, wherein the mirrors comprise a first mirror and a second mirror that are adjacent to each other and disposed on a portion of the light path closest to the transparent plate.

20. The method as claimed in claim 19, wherein the correcting the image comprises: maintaining the value of the defective portion of the filtered shading profile as is, if the foreign substance is disposed on at least one of the first and second mirrors; and converting the value of the defective portion of the filtered shading profile into a filtered average value, if the foreign substance is disposed on one of the mirrors other than the first and second mirrors.

* * * * *

UNITED STATES PATENT AND TRADEMARK OFFICE
CERTIFICATE OF CORRECTION

PATENT NO. : 8,405,884 B2  
APPLICATION NO. : 12/489810  
DATED : March 26, 2013  
INVENTOR(S) : Jin-kyung Hong et al.

Page 1 of 1

It is certified that error appears in the above-identified patent and that said Letters Patent is hereby corrected as shown below:

In the Claims:

Column 8, Line 57, In Claim 1, delete "substance;" and insert --substance,--, therefor.

Signed and Sealed this  
Sixteenth Day of July, 2013

Teresa Stanek Rea  
*Acting Director of the United States Patent and Trademark Office*